United States Patent [19]

Yoshida

[11] 4,006,507
[45] Feb. 8, 1977

[54] DEVICE FOR CONVEYING A CARD USED FOR A CARD READER

[75] Inventor: Shigeru Yoshida, Chichibu, Japan

[73] Assignees: Canon Kabushiki Kaisha, Tokyo; Canon Denshi Kabushiki Kaisha, both of Japan

[22] Filed: June 11, 1975

[21] Appl. No.: 585,888

[30] Foreign Application Priority Data

June 14, 1974 Japan .............................. 49-69247

[52] U.S. Cl. .................................. 15/102; 15/246
[51] Int. Cl.² ........................................ F26B 13/28
[58] Field of Search ............ 15/77, 100, 102, 246; 134/6; 235/61.11 R, 61.11 D; 340/149 A; 271/DIG. 9

[56] References Cited

UNITED STATES PATENTS

| | | | |
|---|---|---|---|
| 2,563,224 | 8/1951 | Dunkerly | 15/102 |
| 3,117,333 | 1/1964 | Murray et al. | 15/77 X |
| 3,237,231 | 3/1966 | Zink | 15/102 |
| 3,242,517 | 3/1966 | Buros et al. | 15/77 |
| 3,694,071 | 9/1972 | Touchette | 15/77 X |
| 3,800,349 | 4/1974 | Green | 15/102 X |

Primary Examiner—Edward L. Roberts
Attorney, Agent, or Firm—Fitzpatrick, Cella, Harper & Scinto

[57] ABSTRACT

The device for conveying a card used for a card reader of this invention includes a part for inserting the card into the reader, a path for guiding the inserted card in a predetermined direction, means for transferring the card along with the guiding path, the transferring means being provided on the guiding path, means for driving the transferring means and means for cleaning the card, the cleaning means being provided between said inserting part and the card transfer means near to the inserting part.

8 Claims, 5 Drawing Figures

DEVICE FOR CONVEYING A CARD USED FOR A CARD READER

BACKGROUND OF THE INVENTION

1. Field of the Invention

This invention relates to a device for conveying a card used for a card reader.

2. Description of the Prior Art

Recently, magnetic cards have been often used for inputs of various electronic equipment such as table type computors, cash dispensers, etc.

Since magnetic card systems can minimize the width of the recording tracks and the intervals of data pitches as compared to the optical systems of punched or marked cards, it is possible to increase the recording density, which results in the increase of the information and the compactness in the amount of an card. Therefore, magnetic cards have been widely used. However, the fact must be considered that the surface of the cards are soiled with moisture, such as sweat from the hands, dust and oils, and thus foreign matter attaches to the surface of the rollers used for feeding the cards to the reader, which causes failure due to slippage and so on.

SUMMARY OF THE INVENTION

Accordingly, it is an object of the present invention to provide a device, for conveying a card used for a card reader, capable of removing moisture, dust, and oils around the magnetic card inserting part.

Another object of the present invention is to provide a device, for conveying a card used for a card reader, which always keeps the inserted card clean.

A further object of the present invention is to provide a device, for conveying a card used for a card reader, which can readily mount a card cleaning means.

DESCRIPTION OF THE PREFERRED EMBODIMENTS

Figure 1A:
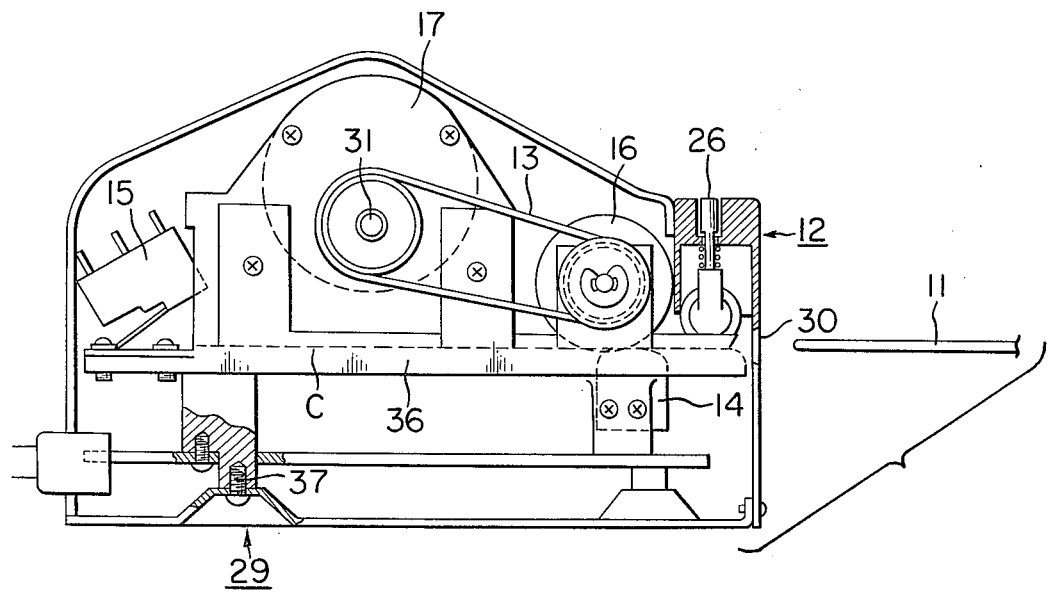
FIG. 1A is a sectional side view of a card reader provided with the device for conveying a card embodying the present invention.
Figure 1B:
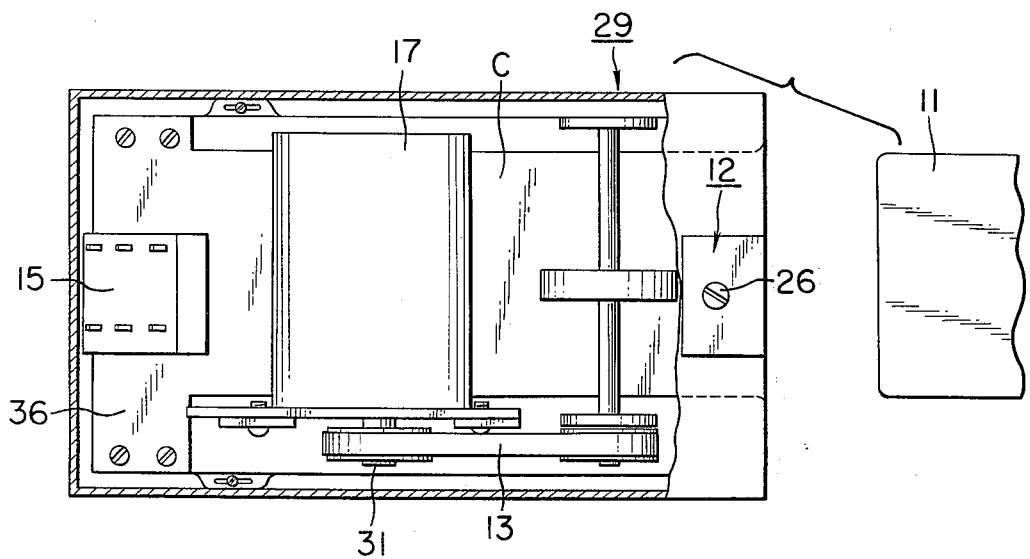
FIG. 1B is a top plan view of said card reader embodying the present invention in which the upper case of the card reader is partially cut away.

Referring to the attached drawings, FIG. 1A is a sectional side view of a card reader incorporating a device for conveying a card according to the present invention. In the card reader a base is secured with screws, etc. to the bottom part of said card reader. On said base are arranged a micromotor 17, a roller, etc., as hereinafter described, and a path is formed for guiding a card, as shown by a dotted line C in the same figure. When the sheet type magnetic card 11, as shown in FIG. 1A, is inserted from a path for an inserting port 30, it passes through a hereinafter described card cleaning means, according to this invention, sitting near said inserting port, to hit a microswitch (not shown).

The output of said microswitch drives said micromotor 17 mounted near the center of said card reader. When a capstan roller 16, arranged adjacent to said card cleaning means, is rotated by the rotating power of the shaft of said micromotor through a belt 13, and when said card is further inserted to the position of said roller 16, said card 11 is advanced by said roller 16 to a place where the magnetic record information on the card is read or some new information is magnetically recorded on it, by a magnetic head installed nearly under the capstan roller 16 and beneath the path for guiding the card. It is to be noted that the card reader employed in the present invention functions both for recording and reading.

After the recording or reading of the card, the card is further advanced until the leading edge of the card hits a microswitch 15 arranged at the end of the card reader, and when said micromotor 17 begins to rotate reversely by the output of said microswitch 15, the card is conveyed to and out through said inserting port 30.

Figure 2:
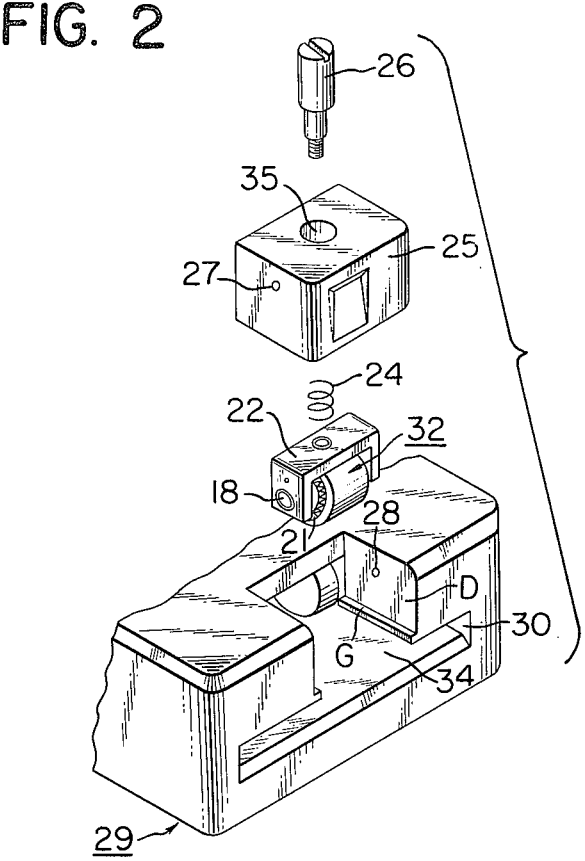
FIG. 2 is a perspective view showing how to mount the device for conveying a card according to the invention into the card reader.
Figure 3A:
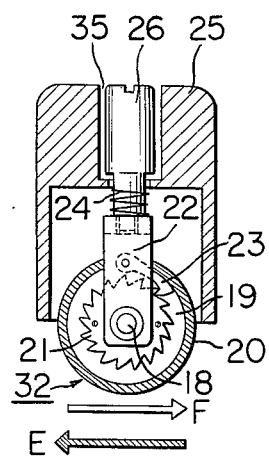
FIG 3A is a fragmentary sectional side view of the device for conveying a card according to the present invention.
Figure 3B:
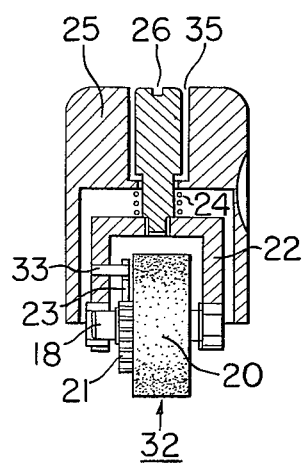
FIG. 3B is a fragmentary sectional front view of the device for conveying a card according to the invention.

Referring to the perspective view of FIG. 2 and the side view and front view of FIGS. 3A and 3B, respectively, the card cleaning means according to the present invention will be explained in detail. A cleaner roller 32 comprises a cleaning member composed of both hygroscopic sponge, fastened round the shaft 18, and hygroscopic fiber, wound around said hygroscopic sponge. On the side of this cleaner roller is secured a ratchet 21 as shown in FIGS. 3A and 3B. A U type holding member 22 for securing the shaft 18 of this cleaner roller, is attached to the case, which is made by molding, etc., through a spring mounted on a cylindrical column member with a staged screw 26, which secures the holding member by a screw portion thereof, and which is inserted in an aperture 35 through the upper part of said case. Because this holding member is held in said case with the aid of a mechanism not shown to permit vertical movement and not to permit rotational movement thereof, said holding member can be moved vertically relative to the case by the turning of said screw member. Because a ratchet detent 23 is secured on the inside of said holding member 22, which is adjacent to the ratchet 21, when the magnetic card is advanced into the card reader in the direction of black arrow E as shown in FIG. 3A, said cleaner roller 32 is pressed down, by the proper pressure of the spring 24, to said magnetic card, and the cleaner roller 32 can not be rotated because of the engagement of the ratchet detent 23 with the ratchet 21, thereby cleaning away the moisture, dust and oil on the card with the portion thereof contacting said card. Accordingly, as the card is fed to the capstan roller 16 after the surface of the card is cleaned, normal running is expected with little chance of slipping. On the contrary when the card is sent back in the direction of the white arrow F, said ratchet detent allows the ratchet, and therefore the roller 32, to rotate in a counterclockwise direction, as viewed, so that the next card is nearly always cleaned with a different portion of the roller 32. The card cleaning means above described is removably mounted in a groove 34, provided near the card inserting port 30 of the front portion of the card reader 29. The location of the groove 34 should be adjacent to the capstan roller 16 so that the surface of the card, which is cleaned by the cleaning roller 32, will contact the capstan roller 16, when said card cleaning means is mounted in the groove. For permitting free loading and unloading of the card cleaning means, the case 25 has concave parts 27 on both sides thereof i.e. on opposite sides, (only one side being shown in FIG. 2). On the other hand the groove is provided with pressing parts on both sides thereof, which include a ball etc., respectively, and which is biased toward the engaging plane D of the groove 34 by resilient means such as a spring acting from inside of the engaging plane D of the groove 34 toward the case 25. The pressing parts are so arranged as to engage the concave part 27 on the case 25, respectively, when the card cleaning means is properly set in said groove. There are further provided, projected plates G projecting toward each other from the engaging planes D of the groove 34 to limit the movement of the bottom part of the case 25. Therefore, the device for conveying a card, according to the present invention, can clean off the soil on the card surface which otherwise would contact the capstan roller. Because the cleaning roller is designed so as not to rotate during the card feeding time and is permitted to rotate freely when the card is returned to be discharged, the card is efficiently cleaned and the next card fed is cleaned with a different part of the cleaning roller. Consequently every part of the cleaning roller can be used equally. This cleaning means is very useful and, as shown in FIG. 2, is readily mounted on the card reader.

I claim:

1. A device for conveying a card comprising a card guiding path having a port for inserting the card and guiding the inserted card along said path;
    means for reciprocatingly transferring the card along the card guiding path in said direction; and
    means for cleaning the card provided on the card guiding path at the side of the card inserting port thereof relative to the transfer means, the cleaning means comprising a roller having a cleaning member on at least a part of the surface of the roller, at least a part of the roller being contactable with the card, and controlling means for permitting the roller to be rotated in one direction by the card and preventing the roller from rotating in the other direction to effect cleaning of the card as its advances along the stationary roller surface.

2. A device for conveying a card comprising a card guiding path having a port for inserting the card and guiding the inserted card along said path;
    means for reciprocatingly transferring the card along said card guiding path; and
    means for cleaning the card provided on the card guiding path at the side of the card inserting port thereof relative to the transfer means, the cleaning means comprising a roller having a cleaning member on at least a part of the surface of the roller, at least a part of the cleaning means being contactable with the card and controlling means for preventing the rotation of the roller when the card moves in one direction from the card inserting port along the card guiding path but permitting the rotation of the roller when the card moves in the opposite direction.

3. A device for conveying a card comprising a card guiding path having a port for inserting the card and guiding the inserted card in a predetermined direction;
    means for transferring the card along said guiding path in said direction;
    a housing means to cover the device; and
    a card cleaning means removably provided on the housing means, said card cleaning means including a cleaning member which is rotated by the card moving along said guiding path.

4. A device for conveying a card comprising a card guiding path having a port for inserting the card and guiding the inserted card in a predetermined direction;
    means for transferring the card along said card guiding path in said direction;
    housing means to cover the device; and
    card cleaning means removably provided on said housing means and comprising a roller, a cleaning member on at least a part of the roller, a case surrounding the roller, the housing having holding means to hold the case in operational position.

5. A device for conveying a card according to claim 4, in which said case has a concave part on its surface and the holding means comprises a groove provided at a part of said housing and fixing means to secure the case in the groove by the engagement of the concave part of the case with the groove when the case is placed in the groove of the housing.

6. A device for conveying a card comprising a card guiding path having a port for inserting the card and guiding the inserted card in a predetermined direction;
    means for reciprocatingly transferring the card along the card guiding path;
    a housing means to cover the device including said card guiding path and having a groove portion formed at the side of the card inserting port relative to the transferring means; and
    a card cleaning means removably attached to the groove portion of the housing which comprises a roller, a cleaning member secured to at least a portion of the surface of the roller and including a hygroscopic fibre, means for pressing said roller toward the card guiding path, controlling means for preventing the rotation of the roller when the card moves in the forward direction from the card inserting port along the card guiding path but permitting the rotation of the roller when the card moves in the backward direction, and a case surrounding the roller, pressing means and controlling means.

7. A device for conveying a card according to claim 6, in which the case has a concave part on its surface and the groove portion of the housing further comprises a pressing member provided on the surface of the groove and biased toward the surface of the groove for engaging with the concave part of the case when the case is placed in the groove, and a limiting member provided on the surface of the groove for limiting the movement of the case when the case is placed in the groove.

8. A device for conveying a card comprising a card guiding path having a port for inserting the card and guiding the inserted card in a predetermined direction;
    means of reciprocatingly transferring the card along the card guiding path;
    a card cleaning means for cleaning the card moving along the card guiding path, which comprises a cleaner roller wound with a sponge member around its shaft and wound with a hygroscopic fiber over the sponge member, a ratchet secured to the side surface of the cleaner roller, a U-shaped holding member for holding the shaft of the cleaner roller, a ratchet detent member provided on the face of the U-shaped holding member facing the ratchet; a case having a concave part of the surface thereof and a hole on the top thereof for surrounding the cleaner roller and the U-shaped holding member, and a screw passing through said hole and securing the U-shaped holding member through a spring for holding the cleaner roller and the U-shaped holding member in the case; and a housing means covering the device including the card guiding path and being formed with a groove in the vicinity of the card inserting port for holding the card cleaning means, the groove comprising a pressing member biased toward the surface of the groove for engaging with the concave part of the case when the case is placed in the groove, and a limiting member for limiting the movement of the case when the case is placed in the groove.

* * * * *

UNITED STATES PATENT AND TRADEMARK OFFICE
CERTIFICATE OF CORRECTION

PATENT NO. : 4,006,507
DATED : February 8, 1977
INVENTOR(S) : SHIGERU YOSHIDA

It is certified that error appears in the above-identified patent and that said Letters Patent are hereby corrected as shown below:

Column 1, line 17, change "in the" to -- in an --;

Column 2, line 12, after "head" insert -- 14 --;
          line 34, after "spring" insert -- 24 --;
          line 39, after "mechanism" insert a -- , --;

Column 3, line 66, before "guiding" insert -- card --.
Column 4, line 68, change "part of" to -- part on --.

Signed and Sealed this fifth Day of July 1977

[SEAL]

Attest:

RUTH C. MASON
*Attesting Officer*

C. MARSHALL DANN
*Commissioner of Patents and Trademarks*